(12) United States Patent
Ledoux et al.

(10) Patent No.: US 9,328,031 B2
(45) Date of Patent: May 3, 2016

(54) METHOD FOR LIMITING THE USE OF AN AMMONIUM NITRATE FERTILIZER AS A PRECURSOR FOR AN EXPLOSIVE AND COMPOSITION THEREFOR

(71) Applicant: YARA INTERNATIONAL ASA, Oslo (NO)

(72) Inventors: Francois Ledoux, Cormeilles en Parisis (FR); Bart De Moor, HJ Sluiskil (NL)

(73) Assignee: YARA INTERNATIONAL ASA, Oslo (NO)

( * ) Notice: Subject to any disclaimer, the term of this patent is extended or adjusted under 35 U.S.C. 154(b) by 0 days.

(21) Appl. No.: 14/422,812

(22) PCT Filed: Aug. 28, 2013

(86) PCT No.: PCT/EP2013/067800
§ 371 (c)(1),
(2) Date: Feb. 20, 2015

(87) PCT Pub. No.: WO2014/033161
PCT Pub. Date: Mar. 6, 2014

(65) Prior Publication Data
US 2015/0218058 A1    Aug. 6, 2015

(30) Foreign Application Priority Data
Aug. 29, 2012 (NO) .................................. 20120975

(51) Int. Cl.
C05B 1/02 (2006.01)
C05C 1/00 (2006.01)
C05G 3/00 (2006.01)

(52) U.S. Cl.
CPC ... *C05C 1/00* (2013.01); *C05B 1/02* (2013.01); *C05G 3/00* (2013.01)

(58) Field of Classification Search
None
See application file for complete search history.

(56) References Cited

U.S. PATENT DOCUMENTS 1,482,479 A    2/1924   Mittasch et al.
2,214,354 A    9/1940   Snelling
(Continued)

FOREIGN PATENT DOCUMENTS

AU    534 813    2/1984
DE    542 622    1/1932
(Continued)

OTHER PUBLICATIONS

International Search Report and The Written Opinion of the International Searching Authority issued Jun. 26, 2014 in International (PCT) Application No. PCT/EP2013/067800.
(Continued)

*Primary Examiner* — Wayne Langel
(74) *Attorney, Agent, or Firm* — Wenderoth, Lind and Ponack, L.L.P.

(57) ABSTRACT

The present invention relates to a fertilizer composition comprising ammonium nitrate, of which the potential misuse as a precursor for an explosive is limited on the one hand, without hampering its legitimate use by farmers for food production on the other hand, to a method for the preparation of said fertilizer composition, and to the use thereof. The fertilizer composition comprising ammonium nitrate comprises a non-hygroscopic agent which is able to form a non-hygroscopic fertilizer composition with ammonium nitrate under normal conditions of storage and use, and to form an hygroscopic composition with ammonium nitrate after said fertilizer composition is contacted with water, and optionally a foaming agent. According to one embodiment, the non-hygroscopic agent is selected from the group of non-hygroscopic urea double salts, in particular urea calcium nitrate (UCaN).

15 Claims, 1 Drawing Sheet

(56) References Cited

U.S. PATENT DOCUMENTS

| | | | |
|---|---|---|---|
| 3,070,435 A | 12/1962 | Reusser et al. | |
| 3,148,945 A | 9/1964 | Griffith et al. | |
| 3,171,716 A | 3/1965 | Diekmann et al. | |
| 3,476,544 A | 11/1969 | Vasan | |
| 3,617,239 A | 11/1971 | Klanica et al. | |
| 3,867,124 A * | 2/1975 | Church | C05C 1/02 423/396 |
| 3,938,469 A * | 2/1976 | Nau | 118/303 |
| 3,961,932 A * | 6/1976 | Miller | 71/1 |
| 4,026,695 A * | 5/1977 | Young | 71/28 |
| 4,026,696 A * | 5/1977 | Young | 71/28 |
| 4,028,088 A * | 6/1977 | Young et al. | 71/28 |
| 4,507,139 A | 3/1985 | Sullivan et al. | |
| 4,565,564 A | 1/1986 | Backlund | |
| 4,874,595 A | 10/1989 | Crispoldi et al. | |
| 5,716,591 A | 2/1998 | Crispoldi | |
| 5,849,364 A | 12/1998 | Nachtman et al. | |
| 6,565,860 B1 * | 5/2003 | Walker | 424/400 |
| 6,826,866 B2 * | 12/2004 | Moore et al. | 47/48.5 |
| 8,858,672 B2 * | 10/2014 | Kweeder | 71/31 |
| 2008/0098781 A1 * | 5/2008 | Lylykangas et al. | 71/11 |
| 2008/0223098 A1 | 9/2008 | Taulbee | |
| 2012/0036908 A1 * | 2/2012 | Kweeder | C05C 1/00 71/58 |

FOREIGN PATENT DOCUMENTS

| | | |
|---|---|---|
| DE | 609 799 | 2/1935 |
| FR | 744 263 | 4/1933 |
| FR | 2 572 244 | 5/1986 |
| GB | 373211 | 5/1932 |
| GB | 382 368 | 10/1932 |
| GB | 1 101 638 | 1/1968 |
| SU | 893981 | 12/1981 |
| WO | 95/18081 | 7/1995 |
| WO | 97/14665 | 4/1997 |
| WO | 01/42172 | 6/2001 |
| WO | 04/000759 | 12/2003 |
| WO | 2007/084873 | 7/2007 |

OTHER PUBLICATIONS

Written Opinion of the International Preliminary Examining Authority issued Dec. 23, 2014 in International (PCT) Application No. PCT/EP2013/067800.

Search Report issued Nov. 20, 2014 in corresponding Norwegian Application No. 20120975, with English translation.

Guidance For The Compatibility Of Fertilizer Blending Materials, European Fertilizer Manufacturers Association (EFMA), Jun. 2006, pp. 1-12.

* cited by examiner

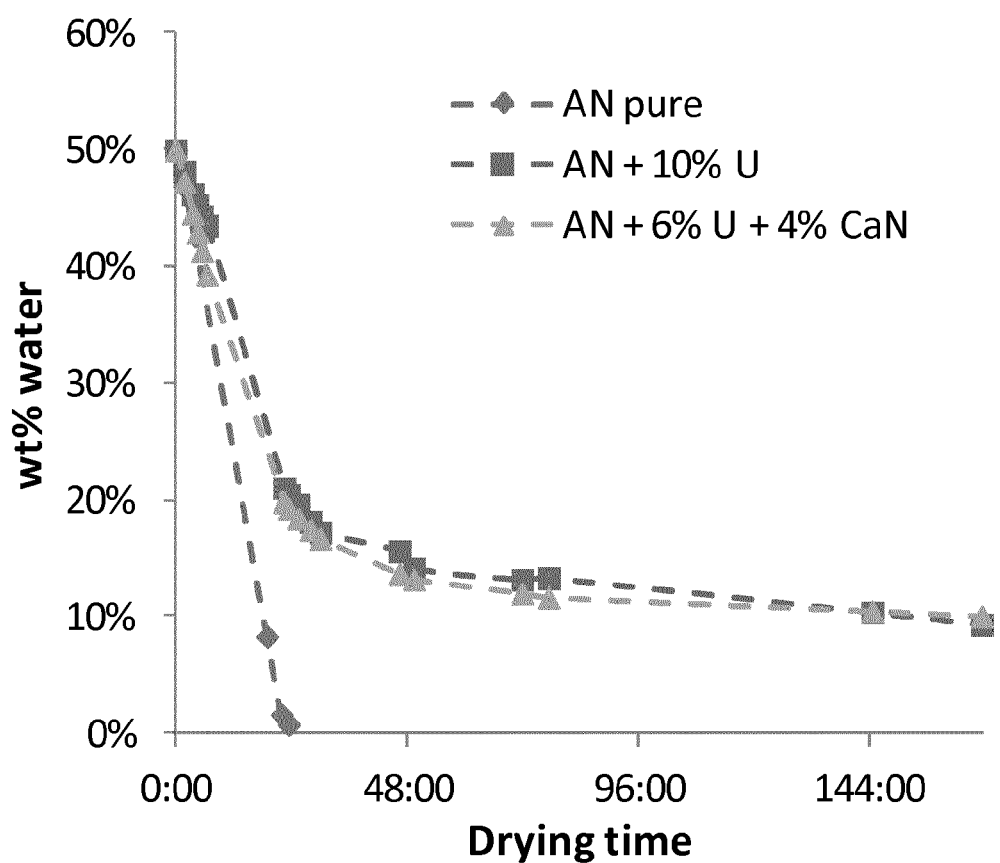

METHOD FOR LIMITING THE USE OF AN AMMONIUM NITRATE FERTILIZER AS A PRECURSOR FOR AN EXPLOSIVE AND COMPOSITION THEREFOR

FIELD OF THE INVENTION

The present invention relates to a fertilizer composition comprising, as a main component, ammonium nitrate, of which the potential misuse as a precursor for an explosive is limited on the one hand, without hampering its legitimate use by farmers for food production on the other hand.

BACKGROUND OF THE INVENTION

Ammonium nitrate (AN), with the chemical formula $NH_4NO_3$, is a worldwide available chemical compound, produced in millions of tons every year. Its main use is as a fertilizer, and therefore it is widely availability and easily accessible in many countries around the world. Its second main use is for the manufacture of explosives, and it is by definition very closely controlled.

An undesired use is for the production of home-made explosives (HME's) such as a mixture of ammonium nitrate and fuel oil (ANFO) or a mixture of ammonium nitrate and nitro methane (ANNM), of which the recipes are publicly available, for example on the Internet. In practice, to produce an HME out of AN-based fertilizer is rather straightforward, and misuse of AN-based fertilizer into explosives occurs frequently, especially in the context of terroristic attacks, but also by farmers for various blasting purposes, by children or students experimenting with explosives, for example in the production of (illegal) fireworks.

To limit its misuse, many countries have banned the use of pure AN as fertilizer by limiting the nitrogen content of AN-based fertilizer. A typical fertilizer formula is the so-called calcium ammonium nitrate (CAN), i.e. a mix of ammonium nitrate with a carbonaceous filler (limestone, dolomite) and with a maximum AN-content of 80 weight %. Such CAN fertilizer has moreover the advantage of being well-balanced regarding soil pH, avoiding the natural acidification due to the conversion of ammonium nitrogen into nitrate nitrogen to be assimilated by the plants.

Many other AN-based fertilizers exist, not only straight nitrogen (N) fertilizers (with different degrees of N dilution by a filler or containing secondary nutrients such as e.g. Sulphur), but also NPK (indifferently NPK, NP, NK) and especially high N-NPK fertilizers. All of them can be misused, but of course, the preferred choice for a potential misuse would logically be to opt for a fertilizer which is the most concentrated in ammonium nitrate i.e. a straight AN fertilizer or a CAN fertilizer. However, the invention is applicable to all AN-based fertilizers, as long as they contain ammonium nitrate.

There are basically two routes to convert a AN-based fertilizer such as a CAN fertilizer into AN suitable for home-made explosives: (i) a dry route, where the AN-based fertilizer such as a CAN fertilizer is simply crushed and later mixed with other compounds; and (ii) a wet route, wherein the fertilizer is first dissolved into water, allowing to filter out the insoluble components such as limestone or dolomite, thus to get a more concentrated ammonium nitrate product, after removal of water by evaporation, compared to the dry route. The wet route requires more process steps, but definitively allows obtaining a more powerful home-made explosive.

There is a need to limit the potential misuse of AN-based fertilizers, in particular a CAN fertilizer as a precursor for an explosive on the one hand, without hampering their legitimate use by farmers for food production on the other hand.

DETAILED DESCRIPTION OF THE INVENTION

It is an object of the present invention to limit the potential misuse of an AN-based fertilizer, in particular a CAN fertilizer, as a precursor for an explosive on the one hand, without hampering their legitimate use by farmers for food production on the other hand.

This object is met by the fertilizer composition of the present invention comprising ammonium nitrate and a non-hygroscopic agent which is able to form a non-hygroscopic composition with ammonium nitrate under normal conditions of storage and use, and to form an hygroscopic composition with ammonium nitrate after the fertilizer composition is contacted with water, optionally further comprising a foaming agent.

Hence, the fertilizer composition of the present invention may exist at least in two states: a non-hygroscopic state under normal conditions of storage and use, and an hygroscopic state after the fertilizer composition has been contacted with water.

Within the context of this application, with AN-based fertilizer is meant a fertilizer comprising at least ammonium nitrate, in particular a CAN fertilizer, as discussed above. For the purpose of this invention, an AN-based fertilizer, either from the prior art or the claimed fertilizer composition as defined in this application, is defined as a fertilizer composition comprising at least 50 weight % of AN, preferably at least 60 weight %, more preferably at least 70 weight %, even more preferably at least 80 weight %, most preferably at least 90 weight %, relative to the total weight of the fertilizer composition.

Within the context of this application, normal conditions of storage and use are those normally applied to dry granular fertilizer compositions, which are stored in bags or containers, and are distributed on the field as powders, pellets, prills or beads. Within the context of this application, contacting with water may be done by dissolving, dispersing, storing in an atmosphere that contains water vapour, or even grinding, in particular fine grinding. In the latter case, for example, the amount of water that is present in the solid mixture, which does not degrade the fertilizer composition to a large extent, is intimately contacted with the components such that it is absorbed and a hygroscopic mixture is formed. In addition, moisture from the atmosphere could be taken up during grinding.

The inventors have recognized that hygroscopicity (which means the ability to take up moisture from humid air) is a well-known drawback of a dry AN-based fertilizer, decreasing handling and storage properties, and a lot of attention has been devoted to decreasing hygroscopicity of said fertilizer, e.g. by providing the prills with an anti-caking coating. On the other hand, a more hygroscopic fertilizer may be a safeguard against its misuse, as it could turn muddy while being crushed (against misuse via the dry route) and be more difficult to concentrate if dissolved (against misuse via the wet route). Moreover, in both cases, moisture take up is enhanced once the fertilizer has been reprocessed as a precursor for an HME, with two advantages: the handling of AN during its reprocessing gets more tricky, moreover any extra moisture take up before the use as an explosive is limiting the efficiency of the HME. Indeed, during the explosion, the water would evaporate and thus absorb a significant part of the explosion energy, limiting its impact and propagation, or even leading to a powerless fading explosion. Hence, it was recognized that the potential misuse of AN- and/or CAN-based fertilizers could be limited by using this property in an inventive manner, such that a fertilizer composition, comprising ammonium nitrate and a non-hygroscopic agent, is obtained, which is non-hygroscopic as a solid fertilizer, but which becomes hygroscopic when contacted with water and which is very difficult to dry. It is an advantage that this property is not a hindrance for the regular use of the fertilizer composition according to the invention, but is a measure to prevent a potential misuse.

The Critical Relative Humidity (CRH) is the property which is used as an indicator of the degree of likely interaction with atmospheric moisture. It is the value of the relative humidity of the surrounding air, above which the material absorbs moisture and below which it does not or not substantially. Thus, the lower the CRH, the greater the tendency to take up moisture from the atmosphere. It is, therefore, desirable to have high values of the CRH for the raw materials and the finished fertilizers. CRH values are in general measured at 30° C. In most cases, the CRH for blended or compound fertilizers is below the average derived from their components. This drop in the CRH can be significantly high in some cases. A blend consisting of ammonium nitrate and urea is an extreme example of this effect, wherein the CRH of urea and AN is 72.5% and 59.4%, respectively, but the CRH of a mixture of urea and AN is 18.1%. Such a blend takes up moisture very quickly and is difficult to handle in a dry state. A mixture of ammonium nitrate and urea, which is not treated against moisture uptake in the blend, such as by applying a coating to the urea prills, is therefore a priori excluded from this invention. Hygroscopicity can be a significant factor to consider in the selection of the blend components.

The modified AN-based fertilizer of the invention comprises at least one non-hygroscopic agent that will enhance the hygroscopicity of an AN-based fertilizer once the modified AN-based fertilizer of the invention, in particular the ammonium nitrate contained therein, has been contacted with water, especially when the fertilizer is being reprocessed for misuse. With "non-hygroscopic agent" is meant an agent that is not only per se non-hygroscopic but also does not form an hygroscopic AN-based fertilizer once comprised into said AN-based fertilizer, as this would produce a fertilizer composition which is not commercially viable and attractive under normal conditions. One example of a commercially unviable fertilizer composition is ammonium nitrate and uncoated urea.

Accounting for the critical relative humidity of AN of 59.4% at 30° C., the non-hygroscopic fertilizer composition with ammonium nitrate preferably has a CRH of more than 35%, more preferably more than 45%, and most preferably more than 55%, measured at 30° C.

Preferably, the hygroscopic fertilizer composition with ammonium nitrate, after said fertilizer composition is contacted with water, has a CRH of less than 35%, more preferably less than 30% and most preferably less than 25%, measured at 30° C.

Accounting for the critical relative humidity of AN of 59.4% at 30° C., the non-hygroscopic agent preferably has a CRH of more than 35%, more preferably more than 45%, and most preferably more than 55%, measured at 30° C.

The non-hygroscopic agent (1) can be incorporated in the AN-based fertilizer material, for example homogeneously incorporated in the fertilizer during production, (2) can be provided on the AN-based fertilizer, for example as a coating on the individual particles, such as prills or granules, (3) can be provided as a solid blend with the AN-based fertilizer, or any combination of the above.

Preferably, the non-hygroscopic agent rapidly turns the fertilizer composition into a hygroscopic composition when contacted with water, which is then difficult to dry. Preferably, the process takes less than 5 minute, more preferably less than 1 minute.

Preferably, the non-hygroscopic agent has fertilizing properties as well. In such a case, the amount added can be higher without any negative fertilizing impact, thus the efficiency of the searched effect for moisture take up is enhanced, and moreover, the relative efficiency of the potential HME is already reduced by the presence of relatively less ammonium nitrate. Preferably, the non-hygroscopic agent contains nitrogen, preferably in the form of a nitrate or urea compound.

If the fertilizer is dissolved in water and, optionally after filtration, the solution is dried in open air, as it is often practiced in some places because it is cheap and simple, the non-hygroscopic agent will considerably slow down the evaporation process, thus requiring much more surface and means to produce the same amount of explosives, and making de facto the HME production sites easier to detect.

The non-hygroscopic agent may be a single compound or a combination of two or more compounds, selected from the group of a blend, a double salt, and a coated material, or any combination thereof.

According to one embodiment, the non-hygroscopic agent is an hygroscopic compound, in particular a compound having a CRH of less than 45%, which is provided with a coating to prevent or decrease moisture uptake. The coating may be readily soluble in water or may be fragile, such that it is crushed when grinded, and when the coating is dissolved or crushed, the hygroscopic compound, optionally in combination with the ammonium nitrate, takes up water and turns the fertilizer composition according to the invention into a muddy and difficult to dry product.

According to another embodiment, the non-hygroscopic agent is selected from the group of non-hygroscopic urea double salts, wherein non-hygroscopic is as defined above. According to one embodiment, the non-hygroscopic agent is urea calcium nitrate (UCaN).

Urea has the ability to form double salts with many common products used in fertilization. As such, some of the non-hygroscopic agents, used to make the modified AN-based fertilizer may be selected from the group of urea double salts, such as urea calcium sulphate (UCaS), urea magnesium sulphate (UMgS), urea calcium nitrate (UCaN), urea magnesium nitrate (UMgN), urea calcium phosphate (UCaP), urea magnesium phosphate (UMgP), urea superphosphate (USP), etc. and mixtures thereof. Unique, and especially interesting for our invention in this respect is the fact that these double salts are actually compatible with ammonium nitrate, if blended, while the individual salts are not compatible with ammonium nitrate (or at least the mixture turns messy if no special precautions are taken). See *Guidance For The Compatibility Of Fertilizer Blending Materials*, European Fertilizer Manufacturers' Association (EFMA), Ave. E. Van Nieuwenhuyse 4, B-1160 Brussels, Belgium, June 2006, publicly available. For example, UCaN has a CRH of 67.9% at 25° C. (see U.S. Pat. No. 4,507,139 by Sullivan et al., 1985) and forms a stable blend with AN-based fertilizer. However, once dissolved, urea and calcium nitrate are dissociated from the double salt and if ammonium nitrate is present, will form an hygroscopic composition which is very difficult to dry. U.S. Pat. No. 5,716,591 discloses a process for the production of a urea calcium nitrate (UCaN) adduct. The obtained product has a low water content and contains up to 6 weight % of ammonium nitrate as an impurity. Such a product is not an ammonium nitrate based fertilizer according to the invention and is excluded from the scope of the invention.

Preferably, the amount of non-hygroscopic agent is selected between 1 and 50 weight %, relative to the total weight of the fertilizer composition, more preferably between 5 and 25 weight %, most preferably about 10 weight %. This is a relative low amount of non-hygroscopic agent compared to the total fertilizer composition.

According to one embodiment, the fertilizer composition comprises about 90 weight % of ammonium nitrate and about 10 weight % of urea calcium nitrate (UCaN), the latter product comprising about 60 weight % of urea and about 40 weight % of calcium nitrate.

According to another embodiment, the fertilizer composition comprises about 90 weight % of an ammonium nitrate based fertilizer and about 10 weight % of urea calcium nitrate (UCaN), the latter product comprising about 60 weight % of urea and about 40 weight % of calcium nitrate.

According to another embodiment, the fertilizer composition comprises about 90 weight % of calcium ammonium nitrate (CAN) and about 10 weight % of urea calcium nitrate (UCaN), the latter product comprising about 60 weight % of urea and about 40 weight % of calcium nitrate.

To prepare the urea double salts of the invention, different methods can be applied. It is possible to crystallize specifically such salts from a balanced mother solution, but this produces an unsuitable particle size if they are to be blended with ammonium nitrate particles. Therefore, a granular compound is preferable. Different techniques can be used, such as e.g. described in U.S. Pat. No. 4,874,595 (Crispoldi et al., 1989) and U.S. Pat. No. 5,716,591 (Crispoldi, 1998). For the purpose of testing to develop this invention, some UCaN has been granulated in a fluidized bed granulator, with a composition of 60% urea and 40% Calcium Nitrate (i.e. the weight composition corresponding to the stoichiometric composition of the double salt, calcium nitrate tetra-urea), as well as UCaN granules with a slight excess of urea respectively calcium nitrate relative to the stoichiometric composition of the double salt. Fluidized bed granulation is very popular in the fertilizer industry, especially for the granulation of urea and ammonium nitrate (See *Fertilizer Manual*—Chapter 8 and Chapter 9, United Nations Industrial Development Organization (UNIDO) and International Fertilizer Development Centre (IFDC), Kluwer Academic Publishers, P.O. Box 17, 3300 AA Dordrecht, The Netherlands, 1998.

In case of a blend, physical properties (colour, size, density, etc) of the added compound can be adjusted to make it similar to the AN-based fertilizer, in particular a CAN fertilizer, and therefore impossible to detect visually or to separate easily.

The fertilizer composition according to the invention may further comprise other components which may limit its potential misuse as a precursor for an explosive.

In particular, the fertilizer composition according to the invention may further comprise a foaming agent. Although the use of a non-hygroscopic agent according to the invention is very effective in slowing down the drying process of the solution comprising the ammonium nitrate under atmospheric conditions, said solution can also be boiled to dryness using an external heat source such as a gas burner, which uses higher temperatures than ambient temperature. To prevent the use of such an external heat source or such high temperatures, a foaming agent would create a mess in the boiling phase, with foam overflowing the boiling vessel, such that the amount of solution being boiled is to be reduced in order to get a foam disengaging height and the possibility to mechanically break the foam, thus avoid overflowing, and hence, again reducing the rate of production of HME.

Foaming agents are chemical compounds that facilitate foam formation and/or help maintaining the foam integrity. In all cases, foaming agents act as surfactants, reducing the surface tension. A broad spectrum of chemicals may act as foaming agent, and classification is made according to their polar head group as cationic, anionic, nonionic and zwitterionic or amphoteric surfactants.

Cationic surfactants may be selected from the group of quaternary ammonium salts, amines with amide linkages, polyoxyethylene alkyl and alicyclic amines, n,n,n',n' tetrakis substituted ethylenediamines, and 2-alkyl -1-hydroxethyl 2-imidazolines.

Anionic surfactants may be selected from the group of carboxylates, sulphonates, petroleum sulphonates, alkylbenzene sulphonates, naphthalene sulphonates, olefin sulphonates, alkyl sulphates, sulphates, sulphated natural oils and fats, sulphated esters, sulphated alkanolamides, and ethoxylated and sulphated alkyl phenols.

Nonionic surfactants may be selected from the group of ethoxylated aliphatic alcohols, polyoxyethylene surfactants, carboxylic esters, polyethylene glycol esters, anhydrosorbitol ester and ethoxylated derivatives thereof, glycol esters of fatty acids, carboxylic amides, monoalkanolamine condensates, and polyoxyethylene fatty acid amides.

Amphoteric surfactants contains both an acidic and a basic hydrophilic moiety in their surface and may be selected from the group of n-coco-3-aminopropionic acid, sodium salt, n-tallow 3-iminodipropionate, disodium salt, n-carboxymethyl-n-dimethyl-n-9-octadecenyl ammonium hydroxide, and n-cocoamidethyl-n-hydroxyethylglycine, sodium salt.

The invention will now be illustrated by means of the following examples and figures. However, the scope of the invention will by no means be limited thereto.

DESCRIPTION OF FIGURES

FIG. 1: Variation of the water content of aqueous ammonium nitrate solutions (50 weight % dissolved solids) as function of the drying time at 30° C. and 30% relative humidity. The included solutions are: a) pure ammonium nitrate (AN pure), b) ammonium nitrate with 10 weight % urea (AN+10% U) and c) ammonium nitrate with 6 weight % urea and 4 weight % calcium nitrate (AN+6% U+4% CaN)

EXAMPLES

Comparative Example A 20 gram of a pure aqueous ammonium nitrate solution (50 weight % dissolved solids), consisting of 50 weight % of ammonium nitrate is dried in a cup, placed in a climate chamber, in dry conditions of 30° C. and 30% relative humidity. Within 24 hours, most of the water is evaporated and AN solid remains in the cup. This is shown in FIG. 1.

Comparative Example B 20 gram of an aqueous ammonium nitrate solution (50 weight % dissolved solids) consisting of 50 weight % water, 40 weight % ammonium nitrate and 10 weight % urea, is dried under the same conditions as in example 1. After more than 144 hours of drying, the water content is around 10 weight % and an equilibrium seems to be reached. Ongoing drying would not lead to a significant further decrease of the water content and if so, this decrease would anyhow be extremely slow. The evaporation of 70 weight % of the water from the 50 weight % solution takes 48 hours versus only 16 hours in Comparative Example A. However, urea and ammonium nitrate are well known to be not compatible as solids when brought together. The hygroscopic salts they form when brought (e.g. mixed) together are actually the most hygroscopic ones out of normal fertilizers products, as was described, for example, in *Guidance For The Compatibility Of Fertilizer Blending Materials*, European Fertilizer Manufacturers' Association (EFMA), Ave. E. Van Nieuwenhuyse 4, B-1160 Brussels, Belgium, June 2006, publicly available).

In practice, this will lead to a modified AN-based fertilizer that has bad handling properties and that will suffer from caking if stored for longer periods. Comparative Example B is illustrating the principle but is not workable in practice.

Example 1

20 gram of an aqueous ammonium nitrate solution (50 weight % dissolved solids) consisting of 50 weight % of water, 40 weight % ammonium nitrate, 6 weight % urea, and 4 weight % calcium nitrate is dried under the same conditions as in Comparative Example A. The urea and the calcium nitrate were added (10 weight %) to the solution in the form of a double salt (calcium urea nitrate, UCaN), produced according to Example 2. UCaN is also a known fertilizer with composition of about 40 weight % calcium nitrate and about 60 weight % urea (general formula $Ca(NO_3)_2 \cdot 4CO(NH_2)_2$), sometimes containing some 1 to 5 weight % of AN, as is disclosed in U.S. Pat. No. 4,874,595 (Crispoldi et al., 1989) and U.S. Pat. No. 5,716,591 (Crispoldi, 1998).

The drying curve is similar to the drying curve of ammonium nitrate with 10 weight % urea (see Comparative Example B and FIG. 1).

Example 2

Urea forms with calcium nitrate a non-hygroscopic double salt, with a CRH of 67.9%. To produce this double salt, a melt was made of 60 weight % urea with 40 weight % calcium nitrate and granulated into a homogeneous granule using a common batch fluidized bed granulation. The resulting product was blended with ammonium nitrate fertilizer at ambient temperature and at 50° C. to simulate worst case storage conditions, and it remain perfectly free-flowing, while under similar conditions a blend of AN/CAN with urea turns to mud and slurry.

The invention claimed is:

1. An ammonium nitrate based fertilizer composition comprising ammonium nitrate and a non-hygroscopic agent, wherein:
   the non-hygroscopic agent is able to form a non-hygroscopic fertilizer composition with ammonium nitrate under normal conditions of storage and use, and to form a hygroscopic fertilizer composition with ammonium nitrate after said fertilizer composition is contacted with water, wherein
   the non-hygroscopic agent is selected from the group consisting of urea calcium nitrate (UCaN), urea magnesium nitrate (UMgN), urea calcium phosphate (UCaP), urea magnesium phosphate (UMgP), urea superphosphate (USP) and mixtures thereof.

2. The fertilizer composition according to claim 1, wherein the non-hygroscopic fertilizer composition with ammonium nitrate has a Critical Relative Humidity of more than 35%, measured at 30° C.

3. The fertilizer composition according to claim 1, wherein the hygroscopic fertilizer composition with ammonium nitrate, after said fertilizer composition is contacted with water, has a Critical Relative Humidity of less than 35%, measured at 30° C.

4. The fertilizer composition according to claim 1, which comprises at least 50 weight % of ammonium nitrate.

5. The fertilizer composition according to claim 1, wherein the non-hygroscopic agent has a Critical Relative Humidity of more than 35%, measured at 30° C.

6. The fertilizer composition according to claim 1, wherein the amount of the non-hygroscopic agent is between 1 and 50 weight %, relative to the total weight of the fertilizer composition.

7. The fertilizer composition according to claim 1, wherein the non-hygroscopic agent is either incorporated in the ammonium nitrate based fertilizer material, provided on the ammonium nitrate based fertilizer particles, provided as a solid blend with the ammonium nitrate based fertilizer, or any combination thereof.

8. The fertilizer composition according to claim 1, further comprising a foaming agent.

9. The fertilizer composition according to claim 8, wherein the foaming agent is selected from the group consisting of cationic, anionic, nonionic, zwitterionic and amphoteric surfactants.

10. The fertilizer composition according to claim 1, wherein the contacting with water is done by dissolving, dispersing, storing or fine grinding.

11. The fertilizer composition according to claim 1, wherein the fertilizer is selected from the group consisting of a straight N fertilizer, a CAN fertilizer, an NPK fertilizer, an NP fertilizer, an NK fertilizer and a high N-NPK fertilizer.

12. A fertilizer composition comprising about 90 weight % of calcium ammonium nitrate (CAN) and about 10 weight % of urea calcium nitrate (UCaN), wherein the urea calcium nitrate comprises about 60 weight % of urea and about 40 weight % of calcium nitrate.

13. A method for preparing the ammonium nitrate based fertilizer composition according to claim 1, comprising:
   combining the non-hygroscopic agent, ammonium nitrate, and optionally a foaming agent.

14. The method according to claim 13, wherein the non-hygroscopic agent, ammonium nitrate and optionally foaming agent are combined as a dry blend.

15. A method of limiting the potential use of an ammonium nitrate based fertilizer as a precursor for making an explosive, comprising:
   combining a non-hygroscopic agent, ammonium nitrate, and optionally a foaming agent,
   wherein:
   the non-hygroscopic agent is able to form a non-hygroscopic fertilizer composition with ammonium nitrate under normal conditions of storage and use, and to form a hygroscopic fertilizer composition with ammonium nitrate after said fertilizer composition is contacted with water, and
   the non-hygroscopic agent is at least one selected from the group consisting of a non-hygroscopic urea double salt, coated urea, and a compound having a Critical Relative Humidity of less than 45% which is provided with a coating,
   wherein the non-hygroscopic double salt is selected from the group consisting of urea calcium nitrate (UCaN), urea magnesium nitrate (UMgN), urea calcium phosphate (UCaP), urea magnesium phosphate (UMgP), urea superphosphate (USP) and mixtures thereof.

* * * * *